United States Patent [19]
Cioffi

[11] Patent Number: 4,934,754
[45] Date of Patent: Jun. 19, 1990

[54] WIND DEFLECTOR FOR A MOTOR VEHICLE SUNROOF AND METHOD OF ATTACHMENT

[75] Inventor: Angelo G. Cioffi, Bronx, N.Y.

[73] Assignee: Gennaro A. Cioffi, Bronx, N.Y.

[21] Appl. No.: 352,762

[22] Filed: May 16, 1989

[51] Int. Cl.⁵ ................................................ B60J 7/11
[52] U.S. Cl. .................................. 296/217; 296/180.1
[58] Field of Search ........................ 296/91, 180.1, 217

[56] References Cited

U.S. PATENT DOCUMENTS

| | | | |
|---|---|---|---|
| 4,171,846 | 10/1979 | Isleif et al. | 296/217 |
| 4,826,239 | 5/1989 | Nishikowa et al. | 296/218 |

FOREIGN PATENT DOCUMENTS

| | | | |
|---|---|---|---|
| 3132713 | 3/1983 | Fed. Rep. of Germany | 296/217 |
| 3345328 | 6/1985 | Fed. Rep. of Germany | 296/217 |
| 112217 | 5/1988 | Japan | 296/219 |
| 7906876 | 3/1981 | Netherlands | 296/217 |
| 175205 | 5/1935 | Switzerland | 296/217 |
| 624346 | 7/1981 | Switzerland | 296/180.1 |

Primary Examiner—Margaret A. Focarino
Assistant Examiner—Gary C. Hoge
Attorney, Agent, or Firm—Darby & Darby

[57] ABSTRACT

A wind deflecting structure for deflecting air over a rectangular sunroof opening in a motor vehicle roof wherein the sunroof installation includes a hatch. The wind deflecting structure includes a wind deflector transversely mounted on the roof adjacent to a front edge of the sunroof opening and includes a bottom portion spaced from and surrounding the front of the sunroof opening and extending along front side edges of the opening in a direction towards a rear edge of said opening. The deflector has a second portion extending upwardly from said bottom portion and having a central cutout section formed therein which extends in the direction of said bottom portion to allow said hatch to be upwardly rotated to its near vertical position for removal of the hatch. The second portion terminates above the front edge of the sunroof opening and is swept back in a direction toward the rear edge of the opening. It is of sufficient height to deflect onrushing air produced by forward motion of the motor vehicle, above and around the sunroof opening when the hatch is removed. Means for connecting the wind deflector to the roof are also provided.

8 Claims, 1 Drawing Sheet

WIND DEFLECTOR FOR A MOTOR VEHICLE SUNROOF AND METHOD OF ATTACHMENT

FIELD OF THE INVENTION

The present invention relates to a wind deflecting structure for deflecting air over a sunroof opening formed in the roof of a motor vehicle that is configured to allow a hatch, rotatably mounted in the front of the sunroof opening, to be upwardly rotated from a position covering the sunroof opening to a near vertical position for removal of the hatch, or to allow proper wind flow and deflection when a slidable hatch is moved only a slight distance away from the opening. Clips are provided for attachment of the wind deflector to the roof, the clips being self mounting not requiring additional hardware for the connection of the clips to the roof.

BACKGROUND OF THE INVENTION

The prior art has provided various wind deflectors that are designed to deflect onrushing air, produced by forward motion of a motor vehicle, over an open sunroof of the motor vehicle. The sunroof is formed by a rectangular opening in the roof of the motor vehicle and a hatch, adapted for movement between open and closed positions to uncover and cover the sunroof opening. In one type of sunroof, the hatch is rotatably mounted in the front of the sunroof opening so as to be rotatable between the open and closed positions and to be rotatable, past the open position, to a near vertical position for removal of the hatch. In another type of sunroof, the hatch is in the form of a shutter that slides within tracks, formed at the sides of the sunroof opening, between the open and closed positions. When the hatch is open or removed, the wind deflector, by deflecting the onrushing air over the sunroof opening deadens the noise and alleviates the suction that would otherwise be produced by air flowing directly over the sunroof opening.

Examples of prior art wind deflectors, used in connection with rotatable hatches, are disclosed, for example, in U.S. Pat. No. 4,171,846 and U.S. Pat. No. 4,480,869. The wind deflectors disclosed in these patents include a wind deflecting structure having a lower leading edge received in the channel of a strip of weather stripping to provide a seal between the leading edge and the roof of the motor vehicle and a trailing edge located behind the leading edge. The wind deflecting structure is swept back from the leading to the trailing edge to deflect air over the sunroof opening. In order to insure that deflected air does not circulate back into the opening, the wind deflecting structure is wider than the sunroof opening and is mounted to cover the front portion of the opening. Additionally, the wind deflecting structure is connected to the sunroof by a pair of clips. Each clip is connected, at one end, to the deflecting structure by a threaded fastener and a nut and, at the other end, by a sheet metal screw threaded into a hole formed in the roof.

Examples of wind deflectors that are employed for sunroofs having shutter-like hatches may be found in U.S. Pat. No. 4,662,671 and U.S. Pat. No. 4,113,302. The wind deflectors disclosed in these patents have leading edges spaced from and surrounding the front portion of the sunroof opening and recessed trailing edges. When the hatch is slid to its closed position, the hatch slides under the sides of the wind deflector. Thus, the wind deflectors of these patents partially cover the sunroof opening. Generally, such wind deflectors, hatches, and tracks are integral parts of the roof of the motor vehicle and are factory installed items.

A major difficulty involved in using any of the wind deflectors described in the patents mentioned above, when the sunroof is equipped with a rotatable hatch, is that the wind deflector must be removed in order to rotate the hatch to a near vertical position for removal of the hatch. The reason is that such wind deflectors partially cover the sunroof opening. As such, there simply is not enough clearance for the rotation of the hatch to a near vertical position. In U.S. Pat. No. 4,171,846 and U.S. Pat. No. 4,480,869, although the wind deflectors might be removed by removal of the threaded fasteners securing the wind deflectors to the clips, once the threaded fasteners are tightened, they are not intended to be removed. Therefore, the removal of the wind deflectors would be unduly burdensome for the motorist because of the time involved in removing and, thereafter, tightening the fasteners to reattach the wind deflector to the clips. As may also be appreciated, such removal simply would not be possible with the wind deflectors disclosed in U.S. Pat. No. 4,662,671 and U.S. Pat. No. 4,113,302 because such wind deflectors are integral components of the roof of the motor vehicle and, thus, are not designed to be removed.

When the hatch is not rotated for removal, but merely slides to the rear to create an opening, other problems are presented. In particular when the hatch is designed to be moved only partially to the rear, the opening created generally lies under the wind deflector and the opening is, thus, blocked. This problem is ameliorated with the wind deflector of the present invention. Another difficulty encountered in utilizing any of the above noted wind deflector designs is that their installation is complex. In this regard, both the wind deflector designs disclosed in U.S. Pat. No. 4,662,671 and U.S. Pat. No. 4,113,302 are integral parts of the motor vehicle roof. Although both U.S. Pat. No. 4,171,846 and U.S. Pat. No. 4,480,869 describe systems which are somewhat easier to install than those of the prior patents, nevertheless, their installation involves a certain degree of precision. This is because holes within the motor vehicle roof provided for the sheet metal screws used to attach the clips of such wind deflectors must be accurately sited and drilled into the roof.

SUMMARY OF THE INVENTION

The present invention provides a wind deflector for deflecting air over a motor vehicle sunroof opening and a hatch rotatably mounted in the front of the sunroof opening so as to be rotatable from a position covering the sunroof opening to a near vertical position for removal of the hatch, or a hatch which is slid only partially to the rear, thus uncovering only a small portion of the opening.

The wind deflecting structure of the present invention includes a wind deflector transversely mounted on the roof in front of the sunroof opening. The wind deflector has a rearwardly extending leading edge, at the bottom of the wind deflecting structure, spaced from and surrounding the front portion of the sunroof opening and a trailing edge upwardly extending from the ends of the leading edge. A central, cutout section of the trailing edge, above and extending in the direction of the leading edge and flush with the front and side edges of the sunroof opening, allows the hatch to be upwardly rotated to its near vertical position for removal. This central cutout section also provides for adequate air flow when a slidable hatch which slides only partially to the rear is used. A front surface, upwardly swept and extending from the trailing edge, is of sufficient height to deflect onrushing air produced by forward motion of the vehicle, above and around the sunroof opening when the hatch is removed or slid only partially to the rear.

A length of weather stripping is preferably provided as a means for effectuating a weather proof seal between the lower leading edge and the motor vehicle roof. The weather stripping is located between the leading edge and the roof and is provided with a channel within which the leading edge is received.

Means, preferably including at least two clips, are provided for attaching the wind deflector to the roof. In this regard, preferably, the sunroof opening is formed by an opening defined in the roof and a molding. The molding has an outer peripheral portion configured to surround the roof opening and an inner portion depending from the outer peripheral portion and configured to extend into the roof opening.

The clips each have a planar base element adapted to be positioned against the roof and an attachment element connected to the base element and adapted to be attached to the wind deflector. The clips are attached to the wind deflector by attachment means. A curable adhesive is applied to one of the undersides of the outer peripheral portion of the molding and the roof at a location adjacent to the sunroof opening. The wind deflector is transversely positioned on the roof and the base elements are simultaneously positioned against the roof and adjacent to the sunroof opening. The inner portion of the molding is then extended into the sunroof opening and the outer peripheral portion of the molding is then pressed against the roof and the base elements until the adhesive cures. As a result, the molding is attached to the roof, the base elements are held in place, and the wind deflecting structure is attached to the roof, all without defacement of the roof. Therefore, the wind deflecting structure can, if desired, be easily removed from the roof and the roof restored to its original condition without undue effort.

DETAILED DESCRIPTION OF THE INVENTION

Figure 1:
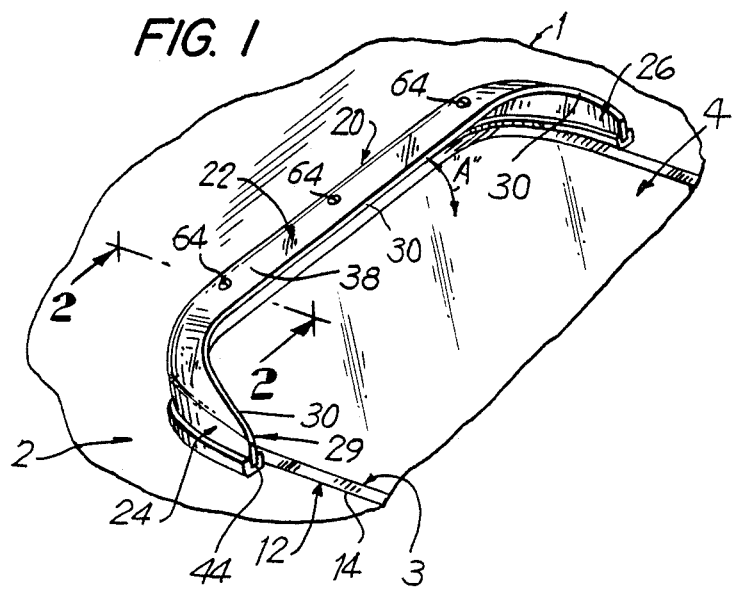
FIG. 1 is a fragmentary, perspective view of a wind deflecting structure, in accordance with the present invention, transversely mounted on a motor vehicle roof adjacent to the front portion of a sunroof opening.
Figure 2:
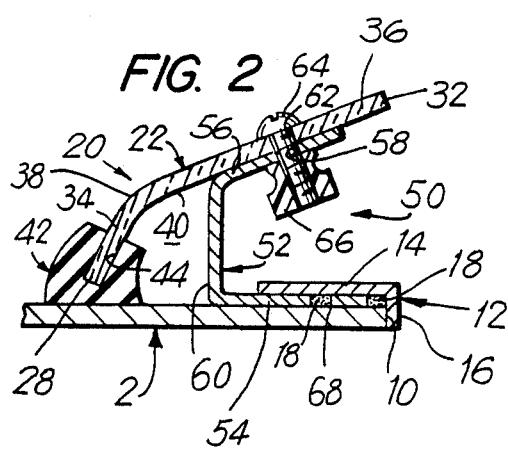
FIG. 2 is an enlarged, cross-sectional view of FIG. 1, taken along line 2—2 of FIG. 1 illustrating a preferred embodiment of a clip in accordance with the present invention for attachment of the wind deflector to the motor vehicle roof.

With reference to FIGS. 1 and 2, a preferred embodiment of a wind deflecting structure 1, in accordance with the present invention, is illustrated as being mounted on a roof 2 adjacent to the front of a sunroof opening 3. A hatch 4 is rotatably mounted in the front of sunroof opening 3, in a manner well-known in the art, and is operable to rotate through an angle "A" between the illustrated closed position and a near vertical position for removal of the hatch.

Sunroof opening 3 is formed by roof opening 10, and molding 12 defines the edges of the sunroof opening 3. Molding 12 includes an outer peripheral portion 14, surrounding roof opening 10, and an inner portion 16 depending from outer portion 14 and extending into roof opening 10. Molding 12 is affixed to sunroof 2 by adhesive 18 which is, preferably, a silicone adhesive that may either be in tape or RTV form.

Wind deflecting structure 1 includes an elongated wind deflector 20, transversely mounted on motor vehicle roof 2 in front of sunroof opening 3. The wind deflector 20 includes a front section 22 adjacent to the front edge of sunroof opening 3 and a pair of side sections 24 and 26, adjacent to the side edges of sunroof opening 3. Side sections 24 and 26 trail from the ends of central section 22 and smoothly merge into central section 22 along arcs.

A rearwardly extending edge 28 is provided at the bottom of wind deflector 22 and is spaced from and surrounds the front a sunroof opening 3. A trailing edge 29 upwardly extends from leading edge 28. A central cutout section 30 of trailing edge 29, extending in the direction of leading edge 28, is flush with the front and side edges of sunroof opening 3 to allow hatch 4 to be fully rotated through angle "A" within cutout section 30 for removal.

Preferably wind deflector 20 has a swept back transverse cross-section and includes a lower wall-like portion 34 rearwardly angled from leading edge 28 and an upper wall-like portion 36, rearwardly angled from lower wall-like portion 34 extending to central section 30. The upper and lower wall-like portions form a front swept back surface 38 and an opposite rear surface 40 of front and side sections 22-26. Front surface 38 is of sufficient height to deflect air over and around sunroof opening 3 when hatch 4 is removed.

Though not illustrated, the wind deflector 22 with the central cutout section 30 is also necessary when a hatch is used which is slid only partially to the rear. With such a construction, employing the full wind deflector of the prior art, without a cutout section, air flow through the sunroof opening 3 is blocked. Employing the wind deflector 22 of the present invention adequate air flow is also obtained when a sliding hatch, moved to only partially uncover the sunroof opening 3, is employed.

Wind deflector 20 is advantageously formed in a thermal forming operation, although other means of plastic forming, such as injection molding, could be used. Preferably, two wind deflecting structures are simultaneously formed. The height of the center of the plastic should be at least about 950.0 mm. to provide for a front surface of the formed wind deflector with a height sufficient for the deflection of onrushing air to attenuate noise and to alleviate updrafts from forming within sunroof opening 3. The formed plastic is then cut in half, and a portion of each half is then cut away to form central cutout section 30 of trailing edge 29. Typically, the completed wind deflector 20 has a width of about 450.0 mm., as measured from front section 22 to the ends of side sections 24 and 26 and a length of between about 76.20 cm. and 91:44 cm., as measured from side section to side section. This will vary, of course, based on the size of sunroof opening 3.

A length of weather stripping 42, having a channel 44, within which leading edge 28 is received, is provided to effectuate a weather tight seal between the leading edge 28 and motor vehicle roof 2.

Two or more clips, each having the configuration of illustrated clip 50, are provided for mounting wind deflecting structure 20 to roof 2. Clip 50 is preferably formed from an elongated planar strip 52 having a bottom section 54 which forms the base element of clip 50. A top section 56 is bent at an angle to base section 54 so as to lie flush against rear surface 40 formed by upper wall-like portion 36. The top section 56 has a hole 58 and forms an attachment element of clip 50, to attach clip 50 to wind deflector 20. A central section 60, upwardly bent at right angles to bottom section 54, connects top and bottom sections 56 and 54.

Wind deflector 20 is provided with a set of bores 62 communicating between the front and rear surface 38 and 40 and in alignment with holes 62 of clips 50. Preferably, clips 50 are are attached to wind deflector 20 by a set of machine screws 64 extended through bores 62 and holes 58 and a complementary set of nuts 66 threaded onto machine screws 64 and tightened against the top section 56 of each clip 50.

After the attachment of clips 50 to wind deflecting structure 20, adhesive 18 is applied to roof 2 around the sunroof opening. Alternatively, adhesive 18 may be applied to outer peripheral portion 14 of molding 12. The wind deflector 20 may then be transversely positioned on roof 2 with the base elements of the clips, formed by bottom sections 54, positioned against roof 2 and adjacent to the sunroof opening. Afterwards, the central portion of molding 12 may be extended into the roof opening and outer peripheral portion 14 of molding 12 may be pressed against roof 2 to attach molding 12 to roof 2, to hold the clips 50 and, therefore, wind deflector 20, in place. As illustrated, an aperture 68 may be provided in bottom section 54 to allow adhesive, prior to setting, to flow through the aperture and aid in holding the clips 50 in place.

Figure 3:
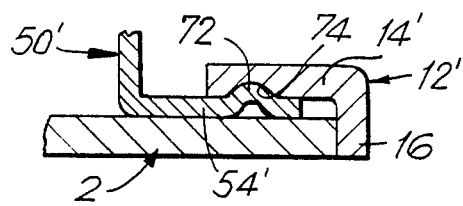
FIG. 3 is an enlarged, fragmentary, sectional view of an alternate embodiment of the clip illustrated in FIG. 2.

FIG. 3 illustrates an alternative embodiment of a portion of a clip. Clip 50' incorporate a bottom section 54'. Bottom section 54' has a lip 72 configured to be received in a notch 74 formed in the underside of an outer section 14' of molding 12' to further aid in holding clips 50 in place. Aside from lip 72 and notch 74, molding 12' and clip 50' are identical to molding 12 and clip 50, discussed above.

The advantage of using clips 50 to attach the wind deflector 20 to roof 2, is that holes drilled into roof 2 are not required. Thus the installation of wind deflecting structure 1 may be more easily accomplished than with prior art installations and without damage to the roof. In this regard, the present invention may be easily adapted to other installations than that specifically illustrated in the preferred embodiment by modifying the design of the preferred clips 50 to accommodate the wind deflecting structures of such other installations. As may be appreciated, the clips used for such other installations must have a base element to be held in place by outer peripheral portion 14 of molding 12 and an attachment element, connected to the base element, to be attached to the wind deflecting structure.

While specific embodiments of the invention have been shown, the invention should not be considered as so limited, but only as limited as set forth in the appended claims.

I claim:

1. A wind deflecting structure for deflecting air over a rectangular sunroof opening in a motor vehicle roof, the sunroof installation including a hatch, said wind deflecting structure comprising:
   a wind deflector transversely mounted on the roof adjacent to a front edge of the sunroof opening and including a bottom portion spaced from and surrounding the front of the sunroof opening and extending along front side edges of the sunroof opening in a direction towards a rear edge of the opening, said deflector having a second portion extending upwardly from said bottom portion and having a central cutout section formed therein, said second portion terminating flush with the front edge of said sunroof opening, said central cutout section extending in the direction of said bottom portion to allow said hatch to be upwardly rotated to its near vertical position for removal of the hatch, said second portion swept back in a direction towards the rear edge of said opening and of sufficient height to deflect onrushing air produced by forward motion of the motor vehicle, above and around the sunroof opening when the hatch is removed; and
   means for connecting said wind deflector to said roof.

2. The wind deflecting structure of claim 1 further comprising means for providing a weather proof seal between said bottom portion of said wind deflector and said motor vehicle roof.

3. The wind deflecting structure of claim 2 wherein said weather seal means comprises a length of weather stripping located between the roof and the wind deflector.

4. The wind deflecting structure of claim 1 wherein a channel is provided on said roof, adjacent said roof opening, for receiving the said bottom portion of said wind deflector.

5. The wind deflecting structure of claim 1 wherein:
   the sunroof opening is formed by an opening defined in the roof and a molding having an outer peripheral portion surrounding the opening, said molding pressed against and adhesively secured to the roof, and an inner portion, depending from the outer portion extending into the opening; and
   said connecting means includes at least two clips spaced apart from one another, each having a planar base element receivable between the outer portion of the molding and the roof and held in place by the pressure exerted by the outer portion of the molding against the roof, said clips further having an attachment element connected to said planar base element and adapted to be attached to said wind deflector, and means for attaching said attachment element to said wind deflector.

6. The wind deflector of claim 5 wherein:
   each of said clips comprises an elongated planar strip having a bottom section to form said base element, a central section upwardly bent from said bottom section and a top section having means for connection to said wind deflector and being bent at an angle from said central section so as to be flush against the rear surface of said wind deflector; and
   said wind deflector has means to associate with the means for connection on said clips to hold said wind deflector to said clips.

7. The wind deflector of claim 5 wherein each of said base elements has an aperture for allowing adhesive to flow through said base elements to aid in holding said base elements between the outer portion of the molding and the roof.

8. The wind deflector of claim 5 wherein;
the molding has at least two spaced notches defined on the bottom of the outer peripheral portion; and
each of said base elements has an upwardly projecting lip engagable within said notches to aid in holding said base elements between the outer portion of the molding and the roof.

* * * * *